G. FISCHER.
BOTTLE OPENER.
APPLICATION FILED OCT. 14, 1909.

961,224.

Patented June 14, 1910.

Witnesses:
John Murtagh
J. Cook

Inventor
George Fischer
By his Attorneys
Gouel & Gouel

UNITED STATES PATENT OFFICE.

GEORGE FISCHER, OF NEW YORK, N. Y.

BOTTLE-OPENER.

961,224.     Specification of Letters Patent.     Patented June 14, 1910.

Application filed October 14, 1909. Serial No. 522,506.

*To all whom it may concern:*

Be it known that I, GEORGE FISCHER, a citizen of the United States of America, residing in New York, in the borough of Brooklyn, county of Kings, and State of New York, have invented certain new and useful Improvements in Bottle-Openers, of which the following is a specification.

This invention relates to an improved bottle-opener, which is to be used with bottles closed by the well-known crown-stopper, and which, instead of a separate device, is applied permanently to each individual bottle so as to be ready for use whenever the bottle is to be opened and which is returned with the bottle to the bottler after the same is empty.

The invention is specially designed for bottlers of beer and other fermented liquids for the direct customers of the same, so that the opening of bottles is facilitated as every bottle is provided with a bottle-opening attachment, and the use for a separate opener is dispensed with.

The invention consists of a bottle-opener attached to the neck of a bottle, and comprising a neck-band, a handle-lever adapted to engage the rim of the closing cap, and a pivot link connection between the handle-lever and the neck-band.

The invention consists further of certain details of construction which will be fully described hereinafter and finally pointed out in the claims.

Figure 1:
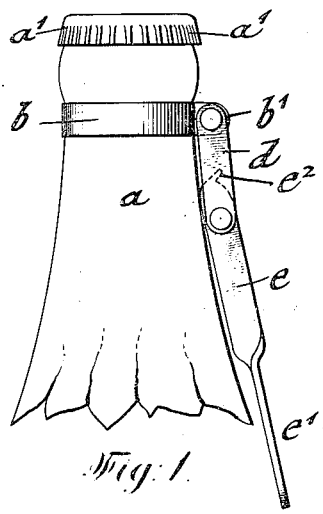
Figure 2:
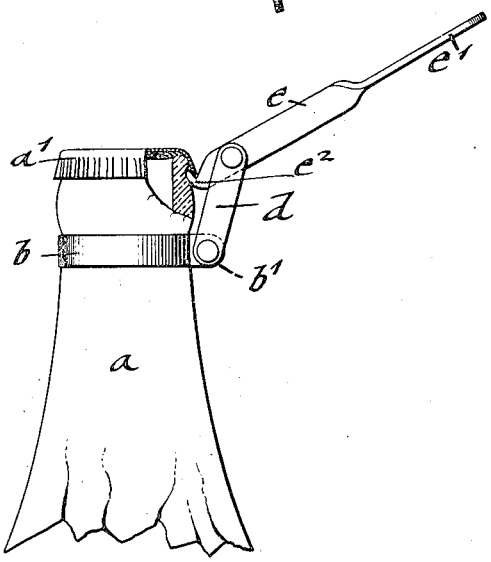
Figure 3:
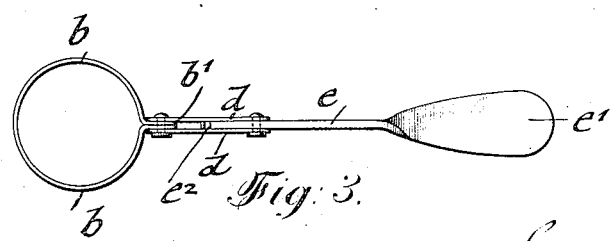

In the accompanying drawings, Figure 1 represents a side-elevation of a bottle with my improved bottle-opener shown as suspended along the neck of the bottle, Fig. 2 is a side-elevation, partly in section, showing the bottle-opener in position for opening the bottle, and Fig. 3 is a plan-view of the bottle-opener shown as detached from the bottle.

Similar letters of reference indicate corresponding parts throughout the views.

Referring to the drawings, $a$ represents the neck of a beer or other bottle, to the upper part of which, below the stopper-cap $a^1$ is attached a bottle-opener which consists of a neck-band $b$ that is fitted tightly around the neck of the bottle and provided with perforated ears $b^1$. To the perforated ears $b^1$ are applied two pivot-links $d$ to which is pivoted an opening-lever $e$ that is provided with a handle $e^1$, which is bent over at right angles to the shank of the lever. The inner end of the handle-lever $e$, $e^1$, adjacent to the neck of the bottle, is provided with a hook-shaped end $e^2$ which serves for engaging the rim of the stopper-cap when it is desired to open the bottle.

When the bottles are delivered to the customer the bottle-opening device is suspended from the neck-band alongside of the bottle, as shown in Fig. 1. When it is desired to open the bottle, the handle-lever $e^1$ is swung in upward direction on the pivot-links, so that the hook-shaped end can engage the rim of the stopper-cap and lift the same by the lever-action exerted on the handle-end of the lever $e$, so as to open and remove the cap from the bottle.

The bottle-opening attachment is preferably made of galvanized sheet-metal and is attached to every bottle, and more especially to those bottles which are delivered to direct customers and which are returned when empty to the bottler. The bottle-opening attachment is not intended for use on bottles shipped to great distances and not returned to the bottler when empty. The attachment has the advantage of being always ready for use without the loss of time required for looking around for the well-known opener used for opening bottles with crown-stoppers.

Having thus described my invention, I claim as new and desire to secure by Letters Patent:

1. A bottle-opener comprising a neck-band, a handle-lever having a hook at its inner end, and a pivot-link connection between the neck-band and handle-lever.

2. A bottle-opener comprising a neck-band provided with perforated ears, a lever provided with a handle at the outer end and a hook at the inner end, and pivot-links connecting the ears of the neck-band and the handle-lever.

3. The combination, with the neck of a bottle, of a bottle-opening attachment comprising a neck-band, a handle-lever provided with a hook at its inner end, and a pivot-link connection between the neck-band and handle-lever.

In testimony, that I claim the foregoing as my invention, I have signed my name in presence of two subscribing witnesses.

GEORGE FISCHER.

Witnesses:
   PAUL GOEPEL,
   J. A. COOK.